（12） United States Patent
Silva

(10) Patent No.: US 10,062,959 B2
(45) Date of Patent: Aug. 28, 2018

(54) MOUNT FOR VEHICULAR ROOF ANTENNA

(71) Applicant: Hirschmann Car Communication GmbH, Neckartenzlingen (DE)

(72) Inventor: David Silva, Nuertingen (DE)

(73) Assignee: HIRSCHMANN CAR COMMUNICATION GMBH, Neckartenzlingen (DE)

( * ) Notice: Subject to any disclaimer, the term of this patent is extended or adjusted under 35 U.S.C. 154(b) by 0 days.

(21) Appl. No.: 15/100,591

(22) PCT Filed: Jan. 16, 2015

(86) PCT No.: PCT/EP2015/050755
§ 371 (c)(1),
(2) Date: Jun. 10, 2016

(87) PCT Pub. No.: WO2015/107146
PCT Pub. Date: Jul. 23, 2015

(65) Prior Publication Data
US 2016/0315379 A1    Oct. 27, 2016

(30) Foreign Application Priority Data
Jan. 17, 2014    (DE) .................. 10 2014 200 853

(51) Int. Cl.
*H01Q 1/32*    (2006.01)
*H01Q 1/12*    (2006.01)
*F16B 13/08*   (2006.01)

(52) U.S. Cl.
CPC ......... *H01Q 1/3275* (2013.01); *H01Q 1/1214* (2013.01); *F16B 13/0833* (2013.01)

(58) Field of Classification Search
CPC .............................. H01Q 1/3275; H01Q 1/32
USPC ................................... 343/711–715
See application file for complete search history.

(56) References Cited

U.S. PATENT DOCUMENTS

| | | | |
|---|---|---|---|
| 6,714,171 B2* | 3/2004 | Haussler | H01Q 1/1214 343/715 |
| 7,004,666 B2* | 2/2006 | Kozlovski | H01Q 1/1214 24/289 |
| 8,441,401 B2 | 5/2013 | Steinkamp | |
| 2008/0131199 A1 | 6/2008 | Hildebrand | |
| 2011/0133047 A1* | 6/2011 | Lerchner | H01Q 1/1214 248/231.21 |
| 2011/0267243 A1* | 11/2011 | Steinkamp | H01Q 1/1214 343/713 |

FOREIGN PATENT DOCUMENTS

| | | |
|---|---|---|
| DE | 102007013842 U | 1/2008 |
| WO | 2013183756 A | 12/2013 |

* cited by examiner

*Primary Examiner* — Dameon E Levi
*Assistant Examiner* — Hasan Islam
(74) *Attorney, Agent, or Firm* — Andrew Wilford

(57) ABSTRACT

The invention relates to a roof antenna (1) comprising a base plate (5) and an outer hood (3) for mounting on a roof (2) of a vehicle, the roof antenna (1) having a fastening mechanism (8) comprising a mounting screw (81) and a fastening claw (82) interacting therewith, characterized in that the base plate (5) forms a socket (83) on which the fastening claw (82) is fixed, and the fastening claw (82) forms a seat cavity (87) for the mounting screw (81), the seat cavity being free prior to insertion of the mounting screw (81) and filled by the mounting screw (81) after insertion thereof.

6 Claims, 3 Drawing Sheets

MOUNT FOR VEHICULAR ROOF ANTENNA

CROSS REFERENCE TO RELATED APPLICATIONS

This application is the U.S.-national stage of PCT application PCT/EP2014/050755 filed 16 Jan. 2015 and claiming the priority of German patent application 102014200853.0 itself filed 17 Jan. 2014.

FIELD OF THE INVENTION

The invention relates to a roof antenna comprising a base plate and an outer hood for mounting on a roof of a vehicle, the roof antenna having a fastening mechanism comprising a mounting screw and a fastening claw interacting therewith.

BACKGROUND OF THE INVENTION

Such generic roof antennas are known that are positioned and fixed on a roof of a vehicle. The fastening claw ensures that the roof antenna is secured on the roof in a prelatched position. For this purpose, the roof antenna is guided with a portion of the fastening mechanism through an opening in the roof, so that a base plate of the roof antenna comes into a position parallel to or in contact with the roof. Then, the mounting screw is actuated from inside the vehicle to secure and immovably fix the roof antenna in the final position thereof on the roof of the vehicle.

OBJECT OF THE INVENTION

The invention addresses the problem of providing a roof antenna for mounting on a roof of a vehicle, which is further improved in terms of installation thereof relative to known roof antennas.

SUMMARY OF THE INVENTION

This object is attained according to the invention in that the base plate of the roof antenna forms a socket in which the fastening claw is fixed, and the fastening claw forms a seat cavity for the mounting screw, the seat cavity being open prior to insertion of the mounting screw and filled by the mounting screw after insertion thereof.

This geometric and structural design first and foremost maintains the ability to position the roof antenna on the roof from above with a part of the fastening region projecting through an opening therein, and fix the roof antenna in a prelatched position by the fastening claw. After this is done, the mounting screw can be actuated to finally and immovably fix the roof antenna onto the roof of the vehicle. For this purpose, the mounting screw is advantageously brought into operative connection with the socket. The fact that the seat cavity of the fastening claw is at first not filled in by the mounting screw makes it possible for the fastening claw to be compressed on passage through the opening in the roof and then expanded. The fastening claw then engages behind the lower face of the roof such that the roof antenna is prelatched thereby. Only then is it possible to bring the mounting screw into operative connection with the socket of the base plate such that the seat cavity in the fastening claw is filled by the mounting screw. This has two advantages, namely first that the operative connection between the socket and the mounting screw fixes the roof antenna onto the roof, and second that the fastening claw is prevented from being compressed again to prevent the roof antenna from being released from the now immovably assumed position thereof on the roof. It is particularly advantageous if the mounting screw has an external thread and a screw head, and the screw head partially or completely fills in the seat cavity of the fastening claw. The socket of the base plate has an internal thread corresponding to the external thread of the mounting screw, so that this threaded connection makes it possible to quickly, easily, and simply screw the mounting screw into the socket, and then simultaneously fastens the fastening claw in the final fit thereof on the lower face of the roof and on the socket.

In one embodiment of the invention, the fastening claw has, at an open end of the seat cavity, at least one barb, preferably two barbs positioned opposite to one another. The at least one barb ensures that the roof antenna is fixed in a prelatched position relative to the roof when the fastening claw has been guided through the opening of the roof, and the at least one barb prevents the roof antenna from being pulled back out of the opening. In addition, the at least one barb then has an electrical function if both the roof and the fastening claw comprising the at least one barb are composed of metal. The operative connection of the mounting screw and socket on the base plate—in particular by screwing the mounting screw into the socket with the thread—presses the at least one barb against the lower face of the roof and causes the at least one barb to come into contact with the lower face of the roof, resulting in an electrical contact. For the case where the lower face of the roof is provided with a covering, e.g. paint, the operative connection of the mounting screw and the socket moves the at least one barb relative to the lower face, scraping through the covering and producing a direct metallic—and, therefore, electrical—contact. Such contact is required, for example, for grounding the shielding of the roof antenna.

In one embodiment of the invention, the socket of the base plate forms a cavity in which a part of the fastening claw is received. If the mounting screw is brought into operative connection with the socket (in particular, if the mounting screw is screwed into the socket), then this results in deformation of the part of the fastening claw, and, in particular, the deformed region of the fastening claw has room in which to extend in the cavity of the socket. This is especially advantageous in that this makes it possible to modify the axial extension of the fastening claw—in particular the axial extension between the contact surface of the at least one barb on the lower face of the roof and the end of the fastening claw with which it is fastened onto the socket—in order to be able to compensate for different roof thicknesses. This provides a roof antenna that can be used in a variable manner, that can be used with the fastening mechanism according to the invention on a variety of roofs (irrespective of whether made of a metal or nonmetallic material).

Further advantages:
Simple assembly and disassembly
Vibration protection available
Suitable for wall thicknesses (sheet thicknesses) of 0.5 to 2.0 mm
Ground connection to the vehicle body available
Mounting screw securely attached

BRIEF DESCRIPTION OF THE DRAWING

Further essential embodiments of the roof antenna according to the invention with the advantageous fastening mechanism thereof, as well as a particularly advantageous method of installing the roof antenna onto a roof of a vehicle are described in further detail below, with reference to the accompanying drawings in which.

SPECIFIC DESCRIPTION OF THE INVENTION

Figure 1:
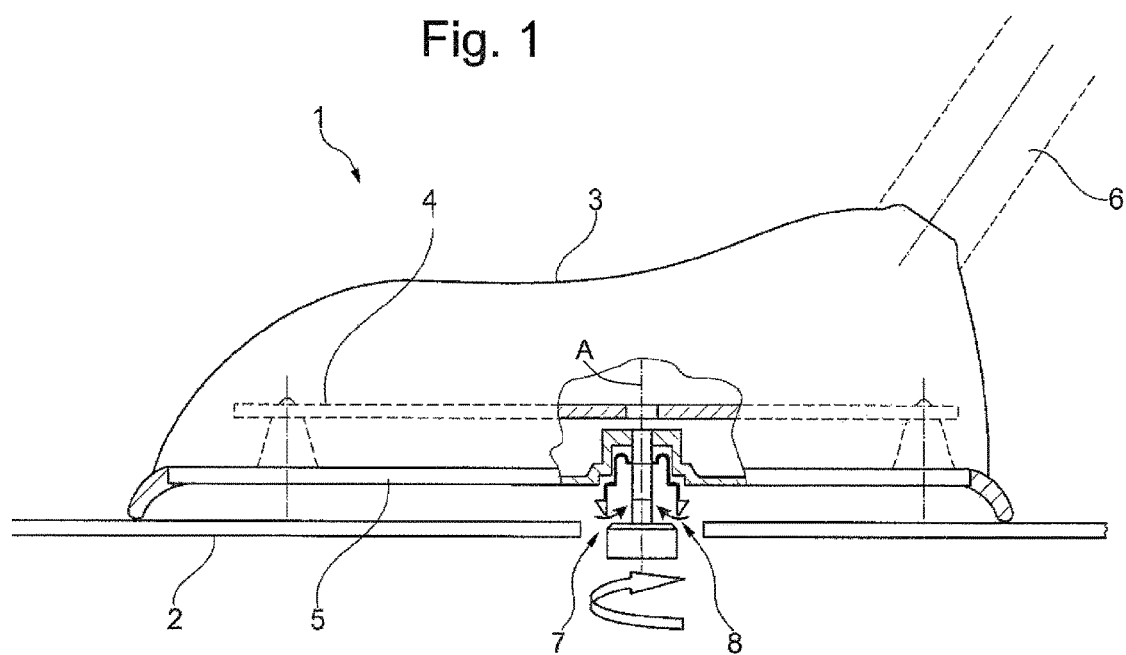
FIG. 1 is a side partly sectional view of the roof antenna of this invention at a very first step of installation.

FIG. 1 is a detail view of an antenna arrangement for a vehicle. A roof antenna 1 is fixed on a roof 2 of the vehicle 2 (not depicted in greater detail here). The roof antenna 1 has, for example in standard form, an outer hood 3 and a printed circuit board 4 below the outer hood 3. Not depicted are the usually present antenna elements for sending and/or receiving high-frequency signals, for such as, for example, telephone, radio, television, GPS, and the like. The printed circuit board 4 is shown spaced from a base plate 5 of the roof antenna 1. Optionally, an optional antenna rod 6 may be provided, with a further antenna element (rod antenna). The antenna sits over an opening 7 in the roof 2, and has a fastening mechanism 8 comprising a mounting screw and a fastening claw, as described below. The opening is centered on an upright axis A.

The construction of the antenna arrangement shown in FIG. 1, with the roof antenna 1, is an illustrative example. In particular, the shown internal construction of the roof antenna inside the outer hood 3 is an illustrative example and may vary.

FIGS. 2 to 6 illustrate the method of installing the roof antenna 1 on the roof 2 in individual steps. The roof antenna 1 according to FIG. 1 is shown partially in the following FIGS. 2 to 6 in the regions around the fastening mechanism 8, including the regions of the base plate 5 and printed circuit board 4 surrounding this region.

Figure 2:
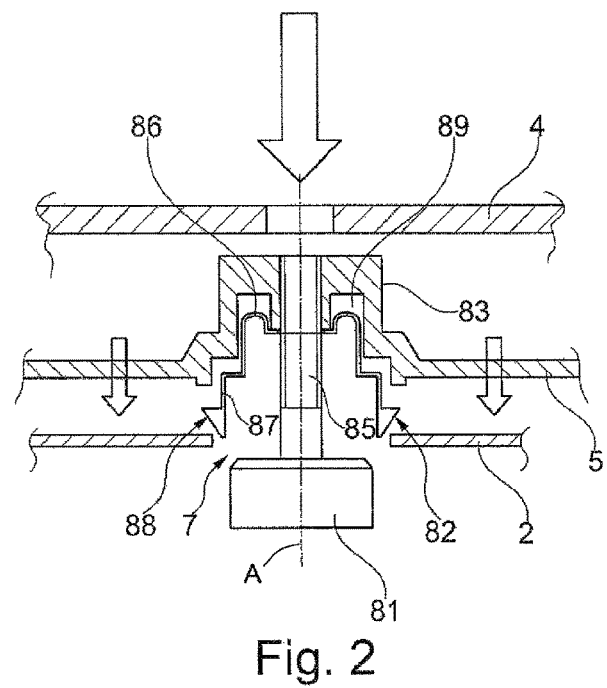
FIGS. 2, 3, 4, 5, and 6 are detail views showing the succeeding installation steps of the inventive roof antenna.

FIG. 2 shows the first installation step where the roof 2 has the opening 7 and the roof antenna 1 is prepared in order to guide the fastening claw 82, which is securely mounted on the base plate 5, through the opening 7. The details of the special design of the mounting screw 81, the fastening claw 82, and the base plate 5 are addressed in further detail below in order to describe the functions thereof.

Figure 3:
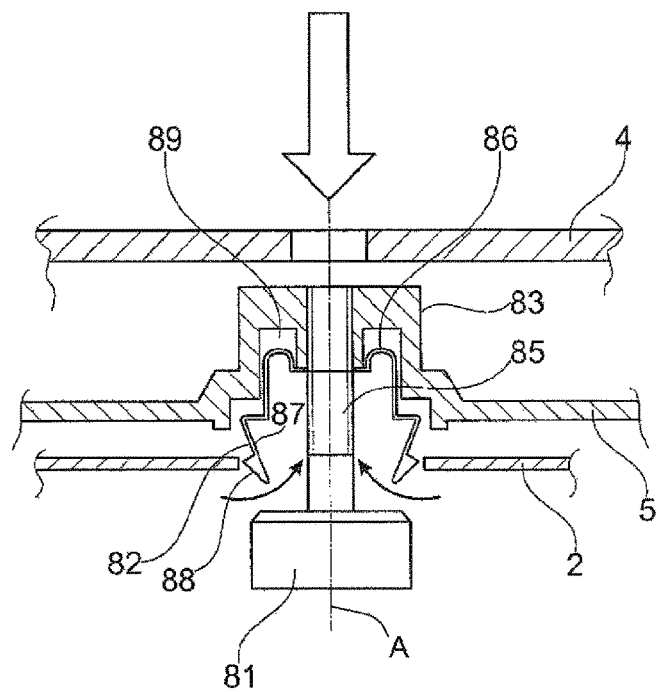

FIG. 3 shows the next step in which the fastening claw 82 is guided through the opening 7. The one or more barbs 88—here, two barbs 88 diametrically opposite one another—are then compressed radially together in the direction shown by the arrows 8. In this state, it is not possible for the mounting screw 81 or more precisely the screw head thereof to fit in a seat cavity 87 defined by the fastening claws 82.

Figure 4:
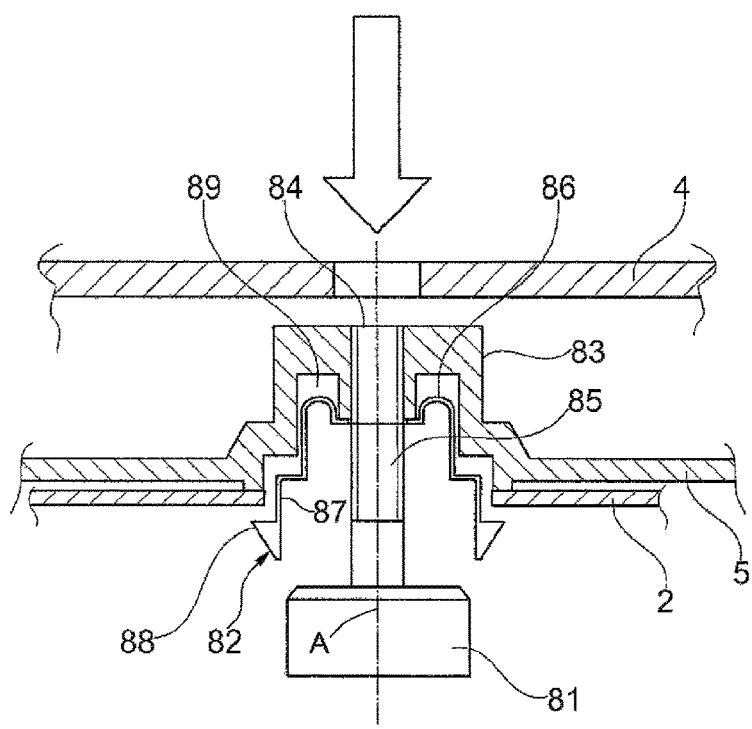

FIG. 4 shows the next step, namely, where the fastening claws 82 are guided so far through the opening 7 that the ends of the fastening claw 82 with the barbs 88 expand back and essentially open up the seat cavity 87 for the head of the mounting screw 81. The coplanar upper faces of the barbs 88 are then oriented at a spacing below the roof 2. It is also conceivable that the lower face of the roof 2 would already come into contact with the upper faces of the barbs 88. In this state, it is possible to bring the mounting screw 81 into operative connection with the base plate 5, however this is not yet the case in this installation step.

Figure 5:
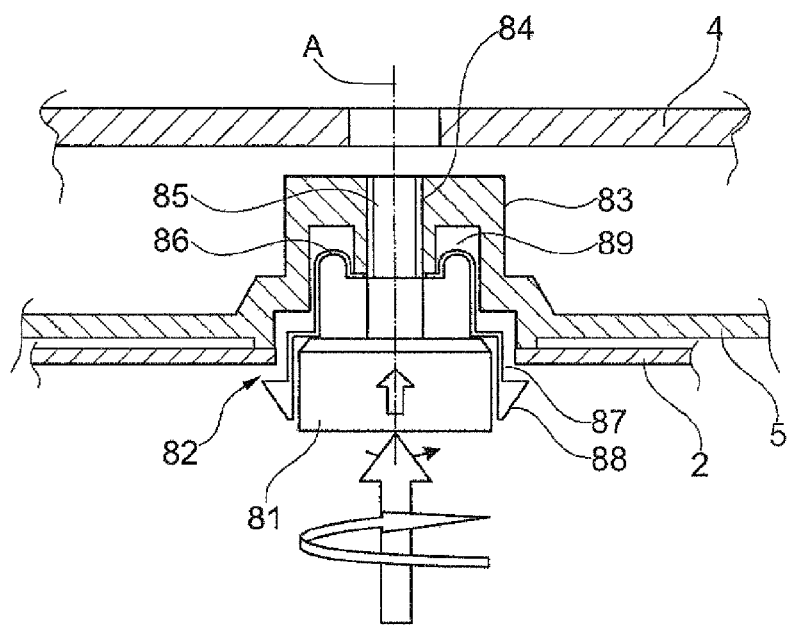

FIG. 5 shows that, due to the opening up of the seat cavity 87 of the fastening claw 82, it is possible to bring the mounting screw 81 into operative connection with the base plate 5. This bringing into contact is accomplished by a threaded connection, as discussed below. However, it would also be conceivable for other possible connections—such as, for example, latching connections, snap connections, or press-fit connections, or the like—to come into consideration.

According to the embodiment shown in FIGS. 2 to 6, the mounting screw 81 is brought as follows into operative connection with the base plate 5. The base plate 5 has a socket 83 formed with an internal thread 84. The mounting screw 81 has an external thread 85 complementary to the internal thread 84 and extending from the screw head (not shown in greater detail) thereof. As can be seen in FIG. 5, the opening up of the seat cavity 87 by the fastening claws 82 allows the mounting screw 81 with its external thread 85 to be screwed into the internal thread 84 of the socket 83 of the base plate 5. A shoulder of each barb 88 of the fastening claw 82 engages the back face of the screw head. This is shown in FIG. 5. This means that in FIG. 4, the roof antenna 1 was secured in a prelatched position to the roof 2, and now can be fastened, from the additional installation step shown in FIG. 5, into the immovable position thereof on the roof 2 through the additional method step from FIGS. 5 to 6. Namely, if the mounting screw 81 is screwed further into the socket 83 of the base plate 5 from the installation position shown in FIG. 5, the fastening claws 82 are entrained axially toward the lower face of the roof 2 (and also simultaneously axially toward the lower face of the base plate 5). This is done until the contact face of the barbs 88 engage directly against the lower face of the roof 2. However, the mounting screw 81 then still is not yet in its final position. Then, through further screwing of the mounting screw 81 into the socket 83, a claw part 86 extending from the socket 83 is deformed and moved into a cavity 89 of the socket 83. Through this process, the roof antenna 1 is positioned and fastened immovably on the upper face of the roof 2. The deformation of the claw part 86 in the cavity 89 of the socket 83 allows for compensation of tolerances and—above all—different thicknesses of the roof 2. Alternatively or in addition thereto, it is possible to adjust a defined tightening torque for the mounting screw 81, by positioning the fastening claw 82 relative to the internal geometry of the socket 83. This ensures that the roof antenna 1 is fastened with such force to the roof 2 that the roof antenna will be held in an immovable position, without damage to the elements involved, especially within the fastening mechanism 8 or possibly even to a part of the vehicle.

Figure 6:
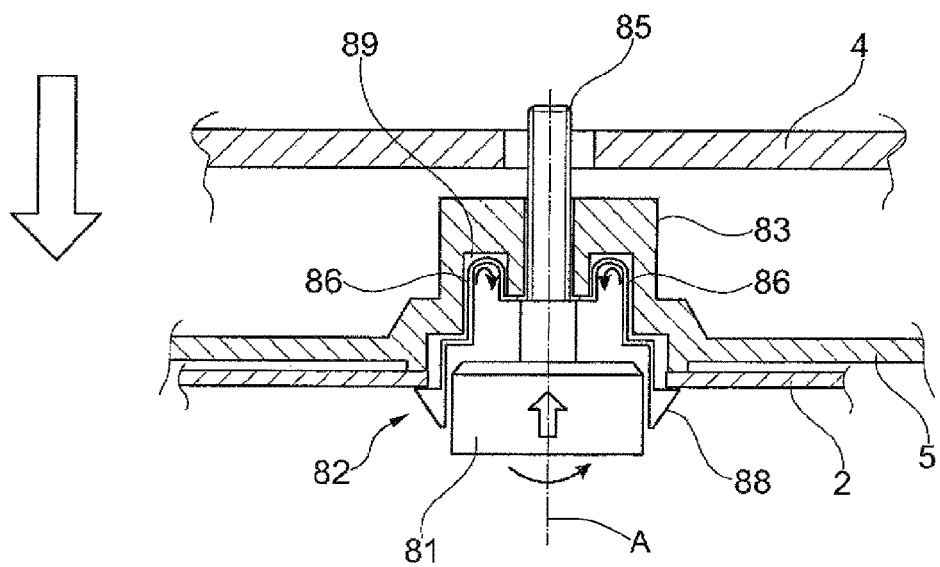

FIG. 6 thus shows the last installation step, in which the mounting screw 81 is screwed with its external thread 85 so far into the internal thread 84 of the socket 83 that the base plate 5 of the roof antenna 1 is positioned and fastened in the target position on the roof 2. The claw part 86 of the fastening claw 82 may—but need not—to be deformed within the cavity 89 of the socket 83. For the case where the end of the mounting screw 81 with the external thread 85 projects out of the socket 83 after being screwed in, the printed circuit board 4 positioned parallel at a spacing from the base plate 5 may have a corresponding opening. In any case, in this installation step shown in FIG. 6, the seat cavity 87 of the fastening claw 82 is filled by the head of the mounting screw 81 so as to prevent the ends of the fastening claw 82 with the barbs 88 thereof from being displaced back inward from the previously assumed spread position, as was the case with the installation step according to FIG. 3. Thus, overall, due also to the deformation of the claw parts 86, the roof antenna 1 is advantageously fastened under prestress in the cavity 89 of the socket 83.

The invention claimed is:
1. A roof antenna comprising:
a base plate;

an outer hood for mounting on a roof of a vehicle;
a mounting screw having a head;
a fastening claw interacting therewith;
a socket formed on the base plate and on which the fastening claw is fixed, the fastening claw forming a seat cavity for the mounting screw, the seat cavity being free prior to insertion of the mounting screw and filled by the head of the mounting screw after insertion thereof.

2. The roof antenna according to claim 1, wherein the fastening claw has at least one barb at an open end of the seat cavity.

3. The roof antenna according to claim 2, wherein the fastening claw has two barbs opposite to one another at an open end of the seat cavity.

4. The roof antenna according to claim 1, wherein the socket of the base plate forms a cavity in which a part of the fastening claw is received.

5. An antenna arrangement of a vehicle, comprising the roof antenna according to claim 1, wherein the roof antenna is positioned and fixed on a roof of the vehicle by the fastening mechanism.

6. In combination with a motor vehicle roof having an upper face, a lower face, and a throughgoing opening centered on an axis, an antenna comprising:

a base plate adapted to sit on the upper face over the opening and formed with a downwardly open socket axially aligned with the hole and formed at the axis with a downwardly open threaded hole, and with a pair of downwardly open cavities diametrally flanking the threaded hole;
a shell engaged down over and secured to the base plate;
antenna electronics between the base plate and the shell;
respective claws each having a deformable upper part in a respective one of the cavities and a lower barb, the claws being diametrally deflectable between an inner juxtaposed position and an outer spread position, the claws being axially deflectable between a lower position and an upper position above the lower position; and
a screw threaded into the hole and having a head dimensioned so as to be engageable between the barbs only in the outer position thereof and being engageable axially with the claws on screwing into the hole to axis push the barbs into the upper position and radially with the barbs to spread the barbs and lock them under the vehicle roof.

* * * * *